United States Patent
Carlson et al.

(10) Patent No.: US 11,188,346 B2
(45) Date of Patent: *Nov. 30, 2021

(54) OBTAINING ENVIRONMENT INFORMATION IN A COMPUTING ENVIRONMENT

(71) Applicant: Oracle International Corporation, Redwood Shores, CA (US)

(72) Inventors: Mike Jared Carlson, Missoula, MT (US); Paul Gregory Greenstein, Hopkinton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/822,898

(22) Filed: Mar. 18, 2020

(65) Prior Publication Data
US 2020/0218547 A1     Jul. 9, 2020

Related U.S. Application Data

(63) Continuation of application No. 15/921,864, filed on Mar. 15, 2018, now Pat. No. 10,664,288.

(51) Int. Cl.
*G06F 9/00* (2006.01)
*G06F 9/4401* (2018.01)
(Continued)

(52) U.S. Cl.
CPC .......... *G06F 9/4416* (2013.01); *G06F 9/4403* (2013.01); *G06F 9/44505* (2013.01);
(Continued)

(58) Field of Classification Search
CPC .. G06F 9/4416; G06F 9/45533; G06F 9/4403; G06F 9/44505
(Continued)

(56) References Cited

U.S. PATENT DOCUMENTS 5,452,454 A * 9/1995 Basu ..................... G06F 9/4416
713/2
10,372,463 B1 * 8/2019 Twomey ............... G06F 9/4416
(Continued)

*Primary Examiner* — Volvick Derose
(74) *Attorney, Agent, or Firm* — Invoke

(57) ABSTRACT

Techniques for obtaining environment information are disclosed. In an embodiment, a host that has not yet completed a boot process obtains information (also referred to as "environment information") about facilities that are available for use in a computing environment. The host does not need any functionality that is enabled through a complete boot process to obtain the environment information. The environment information is used for configuring a system service or application on the host, prior to initialization of the system service or application. Initializing the system service or application with such configurations prepares the system service or application to interact with the existing facilities. In an embodiment, a validator validates functional requirements for a computing environment. The validator obtains the environment information. Based on the environment information, the validator determines whether the facilities available to the computing environment matches a set of expected facilities for the computing environment.

20 Claims, 8 Drawing Sheets

(51) Int. Cl.
  *G06F 9/445* (2018.01)
  *G06F 9/455* (2018.01)
  *G06F 11/14* (2006.01)
(52) U.S. Cl.
  CPC ........ *G06F 9/45533* (2013.01); *G06F 9/4401* (2013.01); *G06F 9/4406* (2013.01); *G06F 11/1417* (2013.01)
(58) Field of Classification Search
  USPC ............................................................ 713/2
  See application file for complete search history.

(56) References Cited

U.S. PATENT DOCUMENTS

| | | | |
|---|---|---|---|
| 2003/0079132 A1* | 4/2003 | Bryant ................. | G06F 21/575 713/182 |
| 2004/0267708 A1* | 12/2004 | Rothman ............ | G06F 11/2284 |
| 2005/0132360 A1* | 6/2005 | Chu ........................ | H04L 67/34 717/177 |
| 2005/0228903 A1* | 10/2005 | Lerner .................. | G06F 15/177 709/250 |
| 2006/0212695 A1* | 9/2006 | Oguma ................ | G06F 9/4416 713/2 |
| 2007/0268917 A1* | 11/2007 | Wong .................... | G06F 9/4416 370/401 |
| 2009/0313429 A1* | 12/2009 | Lee ....................... | G06F 9/4406 711/114 |
| 2011/0072255 A1* | 3/2011 | Gopalakrishnan .... | G06F 9/4416 713/2 |
| 2012/0131179 A1* | 5/2012 | Hu ........................ | G06F 11/302 709/224 |
| 2013/0254521 A1* | 9/2013 | Bealkowski ............ | G06F 9/445 713/2 |
| 2015/0067171 A1* | 3/2015 | Yum .................... | H04L 67/2809 709/226 |
| 2015/0067684 A1* | 3/2015 | Robinson ................ | H04L 63/08 718/1 |

\* cited by examiner

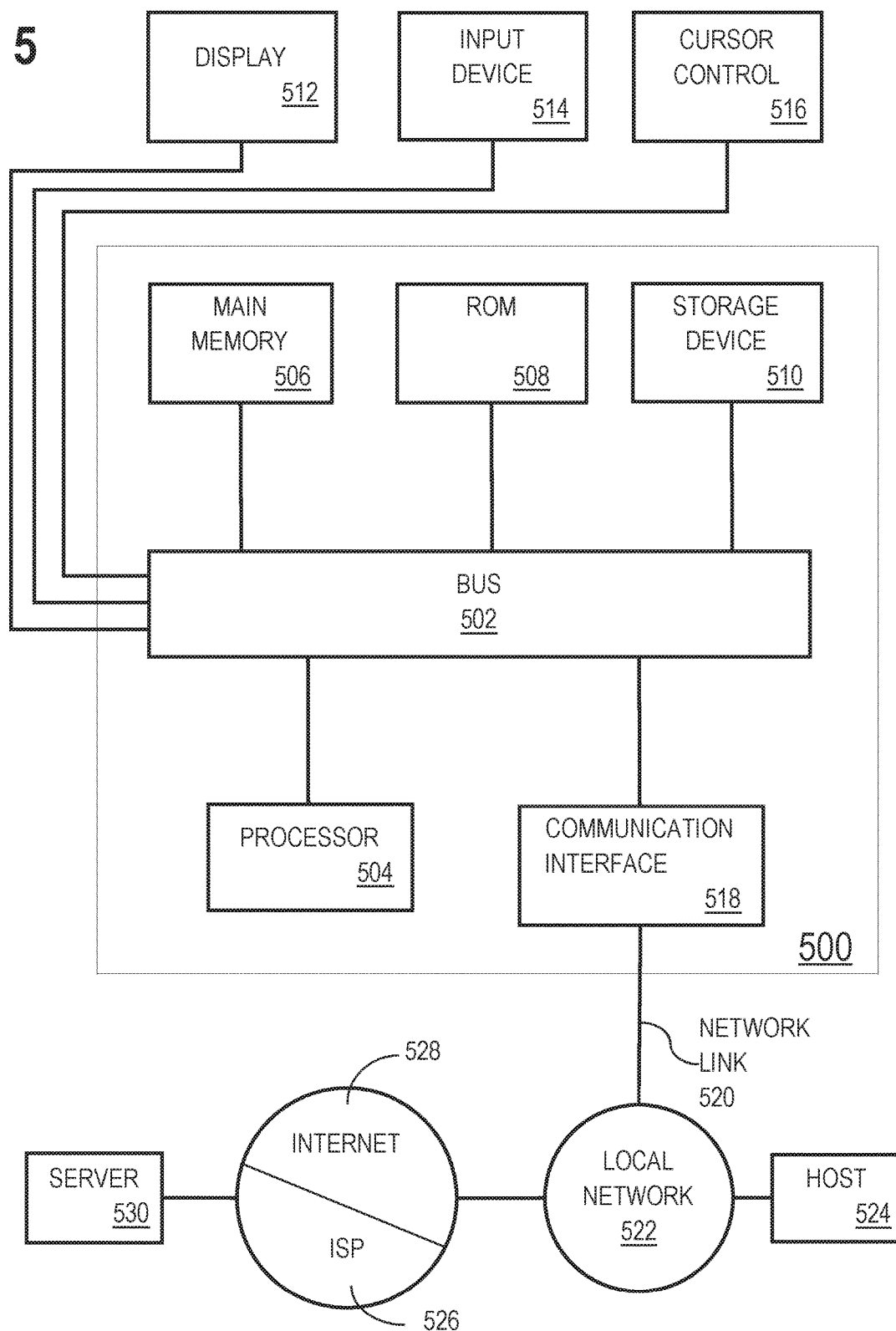

OBTAINING ENVIRONMENT INFORMATION IN A COMPUTING ENVIRONMENT

INCORPORATION BY REFERENCE; DISCLAIMER

The following application is hereby incorporated by reference: application Ser. No. 15/921,864 filed on Mar. 15, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to computing environments. In particular, the present disclosure relates to obtaining environment information associated with a set of one or more facilities available for use in a computing environment.

BACKGROUND

A computing environment may include a large number of hosts. The term "host" may refer to a physical machine and/or virtual machine, including hardware and/or software executing thereon (such as an operating system, a system service, a middleware program, and/or an application). A host newly added to a computing environment may need to interact with existing facilities that are available for use in the computing environment.

Some information that is necessary for interacting with existing facilities can be used by a host only if the information is available during initialization of the host. The host may need to execute an initialization process multiple times in order to (a) obtain information about the existing facilities and (b) utilize the obtained information within the host. As an example, a host may first execute an initialization process for a system service without any information about existing facilities. The system service may enable functionality that the host uses for obtaining information about the existing facilities. Then, the host may re-execute the initialization process for the system service, in order to configure the system service based on the information obtained about the existing facilities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 is a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ENVIRONMENT INFORMATION MANAGEMENT SYSTEM ARCHITECTURE
3. OBTAINING ENVIRONMENT INFORMATION PRIOR TO COMPLETION OF A BOOT PROCESS
4. VALIDATING WHETHER A SET OF REGISTERED FACILITIES MATCHES A SET OF EXPECTED FACILITIES
5. EXAMPLE EMBODIMENT
6. COMPUTER NETWORKS AND CLOUD NETWORKS
7. COMMUNICATIONS PROTOCOLS
8. HARDWARE OVERVIEW
9. MISCELLANEOUS; EXTENSIONS

1. General Overview

In some embodiments, a host that has not yet completed a boot process obtains information (also referred to herein as "environment information") about existing facilities that are available for use by hardware and/or software in a computing environment. The host obtains the environment information from a registry manager, without needing to use any functionality that is enabled through a complete boot process. The host utilizes the environment information to interact with the existing facilities. Obtaining the environment information during the boot process, and prior to initialization of particular system services that utilize the environment information, obviates the need to initialize the system services multiple times, as described above.

In some embodiments, a validator validates functional requirements for a computing environment. The validator communicates with a registry manager that includes environment information. The environment information includes a set of registered facilities. The validator determines whether the set of registered facilities matches a set of expected facilities. By accessing the registry manager, the validator need not individually communicate with each existing facility to determine which facilities are registered with the registry manager. The registry manager provides a central information source for the facilities that are registered as being available to the computing environment. Validating functional requirements for a computing environment is particularly useful during environment creation. One criterion for determining environment completeness, during environment creation, may be successful validation of facilities that are available to the computing environment.

One or more embodiments described in this Specification and/or recited in the claims may not be included in this General Overview section.

2. Environment Information Management System Architecture

Figure 1A:
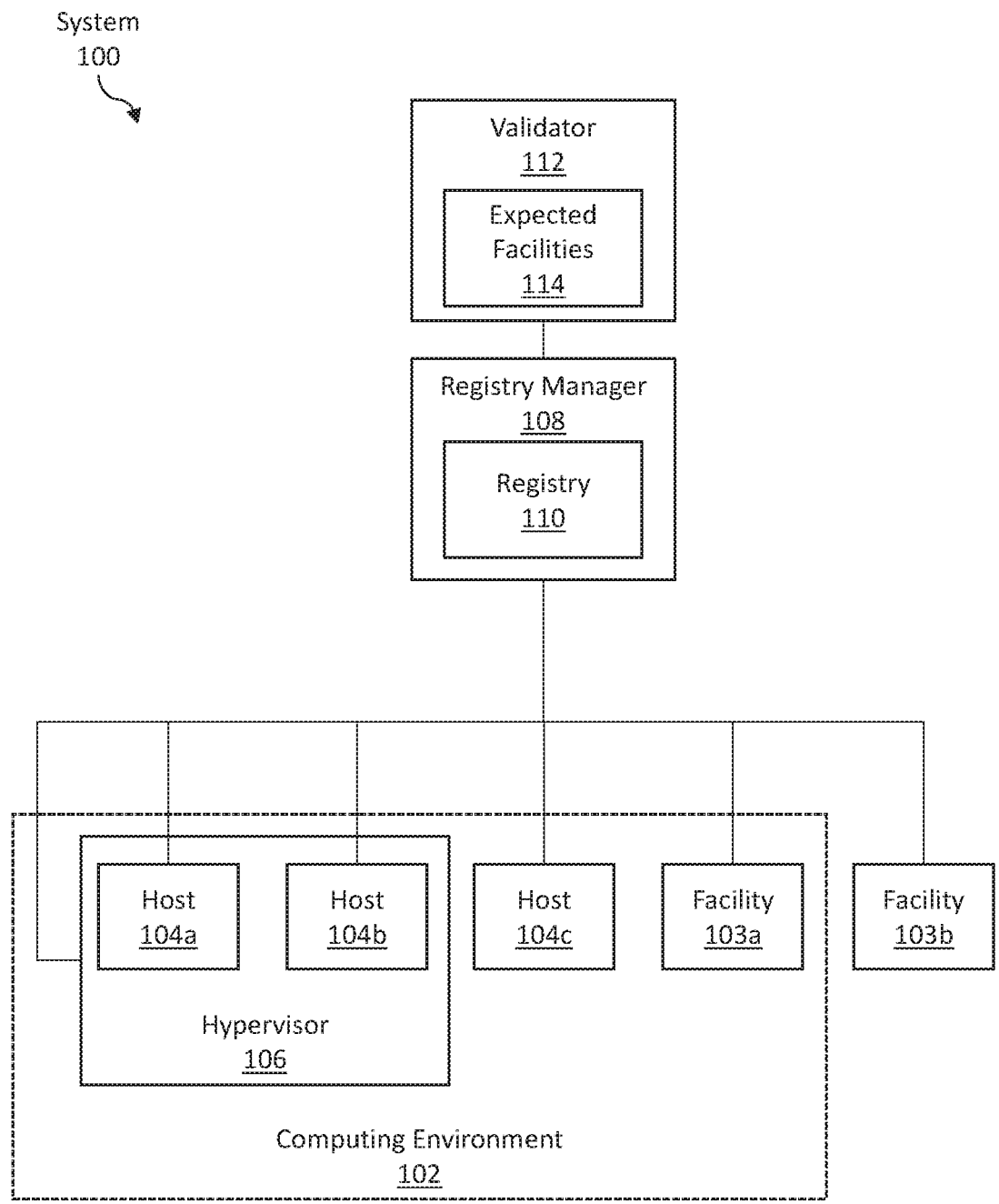
FIG. 1A illustrates an environment information management system, in accordance with one or more embodiments.

FIG. 1A illustrates an environment information management system 100, in accordance with one or more embodiments. As illustrated in FIG. 1A, a system 100 includes a computing environment 102, a hypervisor 106, facilities 103a-b, hosts 104a-d, a registry manager 108, and a validator 112. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a computing environment 102 includes a set of facilities 103a-b and a set of hosts 104a-d. Examples of computing environments include a data center, a subset of a data center, a superset of a data center (such as, several internetworked data centers), a cloud network, a private network, a local network, a set of cloud services, or any hybrid or combination of the above, or any other collection of hardware and/or software components (that may be but are not necessarily interconnected by a network). Additional embodiments and/or examples relating to computer networks are described below in Section 6, titled "Computer Networks and Cloud Networks." As used herein, an entity is "external to" another entity, if the two entities are independently networked. Conversely, an entity is "internal to" another entity, if the two entities are not independently networked.

In one or more embodiments, a facility (such as any of facilities 103a-b) is hardware and/or software configured to provide a particular service and/or functionality to a computing environment. Examples of facilities include a web service, a Lightweight Directory Access Protocol (LDAP) service, a Network Time Protocol (NTP) service, an Identity Management (IDM) service, a Remote Procedure Call (RPC) target, a Remote Method Invocation (RMI) target, a database, a Domain Name System (DNS), a log concentrator, a shared disk, a backup destination, a software or artifact repository, a service that manages access control or security, a service that performs monitoring, a service that performs log aggregation, and a service that provides backup storage. A facility may be accessed using a method, protocol, and/or identifier appropriate for the facility type, such as a Uniform Resource Identifier (URI), an Internet Protocol (IP) address, a port number, a connection string for a database, and a directory on a shared disk.

A facility is provided by a set of one or more hosts. The hosts may be inside or outside of the computing environment 102. As illustrated, for example, a facility 103a may be implemented on hosts inside of the computing environment 102. Another facility 103b may be implemented on hosts outside of the computing environment 102. Facilities 103a-b implemented inside and/or outside of the computing environment 102 are available for use in the computing environment 102 via one or more networks.

In one or more embodiments, a host (such as any of hosts 104a-d) may be a physical machine and/or a virtual machine. Examples of hosts 104a-d include a network device, a network appliance, a switch, and a router. Each host is independently networked. Each host is reachable via IP. Each host is associated with an IP address. Each host may be but is not necessarily physically remote from each other. As an example, virtual machines residing on a same physical machine may be independently networked. The virtual machines are referred to herein as being "external" to each other, even though the virtual machines are not physically remote from each other.

In an embodiment, hosts 104a-d are configured to communicate over a network using one or more network communications protocols (also referred to herein as "communications protocols"). A communications protocol is a system of rules that allow two or more hosts to communicate with each other. The communications protocol defines the rules, syntax, semantics, and/or formats associated with communication between two or more hosts.

A single communication may involve multiple communication layers, which may align to the Open Systems Interconnection (OSI) network model or the Transmission Control Protocol (TCP)/Internet Protocol (IP) network model. Each communication layer may be associated with a different protocol. The set of protocols used throughout the different communication layers of a single communication may be referred to as a "protocol suite" or "protocol stack." For example, a communication over the Internet uses the TCP/IP layers. The TCP/IP layers include: Link layer; Internet layer; Transport layer; and Application layer. The communication is associated with an Internet protocol suite.

A communications protocol may be connection-oriented or connectionless. A single communication may utilize connectionless communications protocols throughout a protocol stack. As an example, a single communication may use IP in the Internet layer, User Datagram Protocol (UDP) in the Transport layer, and Trivial File Transfer Protocol (TFTP) in the Application layer. Each of IP, UDP, and TFTP are connectionless communications protocols. Additional embodiments and/or examples relating to communications protocols are described below in Section 7, titled "Communications Protocols."

In an embodiment, a host in a computing environment 102 interacts with facilities 103a-b that are available for use in the computing environment 102. An interaction between a host in the computing environment 102 and a facility available to the computing environment 102 may be a communication via IP between the host and the facility. Interactions between a host and a facility may be based on unicast, multi-cast, and/or broadcast communications. Examples of interactions between a host in the computing environment 102 and a facility available to the computing environment 102 include transmission of a command from the host to the facility (or vice versa), transmission of a response to a command from the host to the facility (or vice versa), transmission of requested data from the host to the facility (or vice versa), and transmission of system messages or error messages from the host to the facility (or vice versa). For example, a host may interact with a facility to invoke a service via Representational State Transfer (REST), to invoke a service via RPC, to invoke a service via RMI, to send a Hypertext Transfer Protocol (HTTP) or a HTTP Secure (HTTPS) request, to send a File Transfer Protocol (FTP) request, to send a telnet or Secure Shell (SSH)

command, to access a shared disk, to perform a nslookup or other networking function, to perform an authentication or authorization, to provide status information (such as monitoring or alerting), and/or to provide remote control.

In an embodiment, in order for a host to interact with facilities 103a-b that are available for use in a computing environment 102, the host may need information about the facilities 103a-b. Information about facilities 103a-b available for use in a computing environment 102 may be referred to herein as "environment information." A host is configured to obtain environment information from a registry manager 108. Examples of operations for obtaining environment information prior to completion of a boot process are described below with reference to FIG. 2. Information about a facility includes, for example, the facility's identifier(s), the facility's address(es), the facility's port(s), the communication protocol(s) used by the facility, and/or other attributes of the facility. Information about a facility includes, for example, a Uniform Resource Identifier (URI) of the facility, an IP address of the facility, and a Media Access Control (MAC) address associated with the facility. Further examples of types of information included in "environment information" are discussed below with reference to registry 110.

Figure 1B:
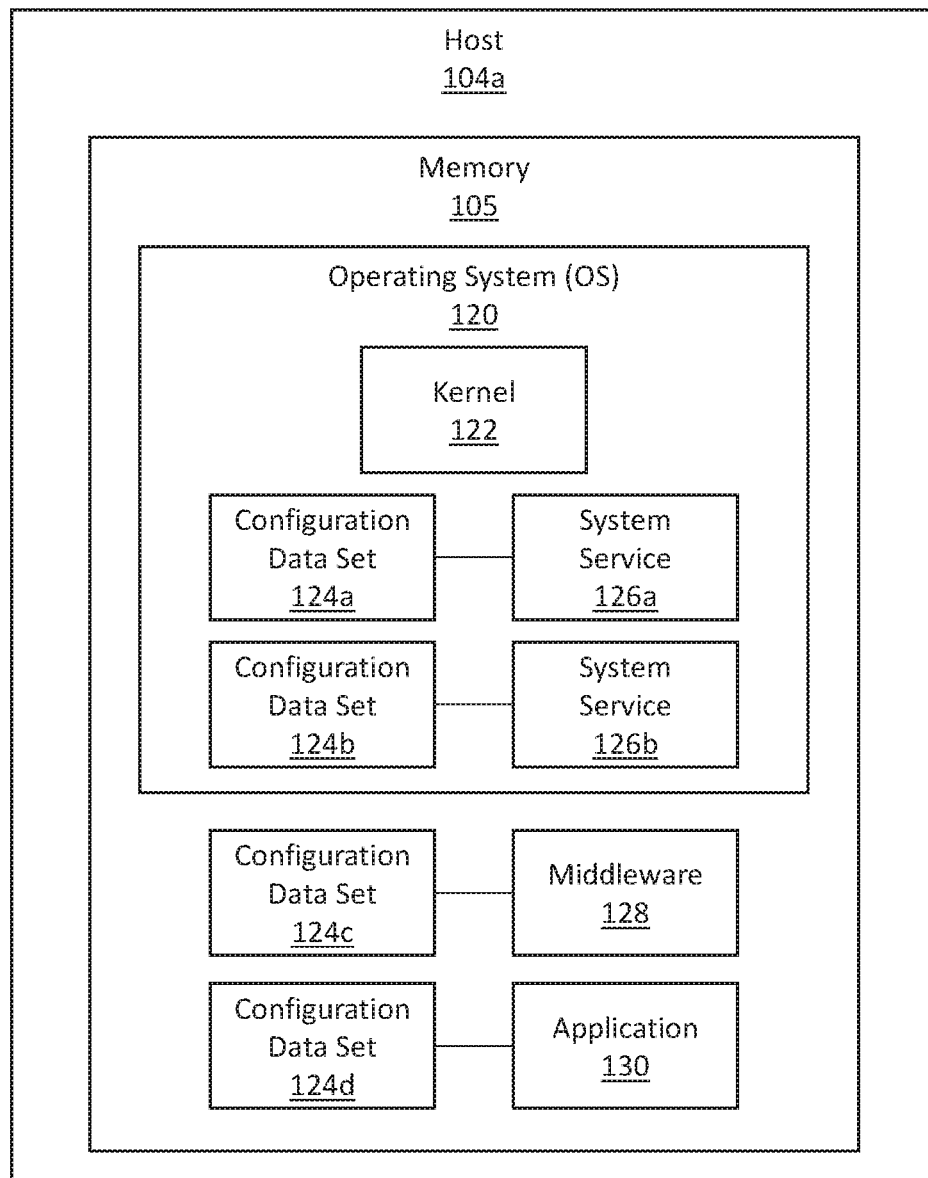
FIG. 1B is a block diagram representing an example host within an environment information management system, in accordance with one or more embodiments.

FIG. 1B is a block diagram representing an example host within an environment information management system, in accordance with one or more embodiments.

In one or more embodiments, a host 104a includes a memory 105, an operating system (OS) 120, one or more middleware programs 128, and one or more applications 130. The operation system 120 includes a kernel 122, and one or more system services 126a-b. The host 104a also includes one or more configuration data sets 124a-d.

In one or more embodiments, a memory 105 of a host 104a is a memory that is internal to the host 104a. The memory 105 is not independently networked from the host 105a. The memory 105 may be any type of memory, storage unit, and/or storage device (such as Random Access Memory (RAM), cache memory, a file system, database, collection of tables, or any other storage mechanism) for storing data. The memory 105 may include multiple different storage units and/or devices. The multiple different storage units and/or devices may or may not be of the same type.

In one or more embodiments, an OS 120 is system software that manages hardware and software resources of a host 104a. The OS 120 provides common services for computer programs on the host 104a. The OS 120 provides a software platform on top of which middleware programs 128 and/or applications 130 can run. Examples of OS include Linux, DOS, Windows, and macOS.

In one or more embodiments, a system service (such as any of system services 126a-b) is a function provided by an OS 120 for middleware programs 128 and/or applications 130 executing on the OS 120. A system service manages platform resources, such as processor(s), memory, files, and input/output. System services may also be referred to as "OS services." Various types of system services 126a-b may be used.

One type of system service is performed as a background process that is not under the control of an interactive user. In a Linux or UNIX system, for example, a system service embodied in a background process may be referred to as a "daemon." Specific examples of daemons in the Linux system include dhcpd, ftpd, ntpd, and sendmail. An example function of a background-process system service is batch processing. A batch processing service supports the capability to queue work or jobs. A batch processing service may be performed asynchronously from the user requesting the job.

Another type of system service is performed based on an interrupt. An example of an interrupt is a supervisor call. An example function of an interrupt-based system service is the control of input/output processing to and from peripheral devices.

Another type of system service is performed based on an inline invocation. An example function of an inline-invocation system service is file management.

Another type of system service is performed based on an indirect invocation. An example function of an indirect-invocation system service is the enforcement of security features. As an example, a system service may present a security prompt in response to an attempt to access a protected file.

A particular function may be performed using system services 126a-b of different types, depending on the OS being used. For example, in one OS, the function of file management may be performed by an inline-invocation system service. In a different OS, the function of file management may be performed by an interrupt-based system service. Additional and/or alternative types of system services, other than those described herein, may be used. Further examples of system services include a service for job scheduling; a service for communicating in TCP/IP; a service for communicating in FTP; a service for communicating in Simple Mail Transfer Protocol (SMTP); a service for accessing Lightweight Directory Access Protocol (LDAP) information; a service for listening to network connection requests; a service for managing clock synchronization in the computing environment; a service for virtual memory management; a print spooler service; a mail listener service; and a user interface (UI) listener service.

In an embodiment, a system service 126a is used by another system service 126b, middleware program 128, and/or application 130 to perform connection-oriented network communications. A system service 126a may be required for another system service 126b, middleware program 128, and/or application 130 to perform connection-oriented network communications. System services used for performing connection-oriented network communications may be referred to herein as "connection-oriented network communications services." An example of a connection-oriented network communications service is a service for communicating in TCP/IP.

In an embodiment, in order for a connection-oriented network communications service to allow connection-oriented network communications, the connection-oriented network communications service needs access to information about certain facilities 103a-b available for use in the computing environment 102. As described above, information about the facilities 103a-b may be referred to as "environment information." As an example, a connection-oriented network communications service may require a URI of a particular facility in order to communicate with the particular facility using a connection-oriented network communications protocol.

In an embodiment, a system service 126a is initialized based on a configuration data set 124a corresponding to the system service 126a. A single configuration data set may correspond to a single system service. Additionally or alternatively, a single configuration data set may correspond to multiple system services. As illustrated, for example, system service 126a corresponds to configuration data set 124a. System service 126b corresponds to configuration data set 124*b*. A configuration data set specifies various configurations for a corresponding system service. A configuration data set specifies, for example, information that is necessary for a corresponding system service to perform connection-oriented communications with facilities available to a computing environment 102. A configuration data set may specify, for example, a domain name of a facility (such as any of facilities 103*a-b*) available to a computing environment 102; a URL of a facility; a port for connecting with a facility; and a communication protocol used by a facility.

A configuration data set (such as any of configuration data sets 124*a-d*) may be stored in one or more configuration files. Additionally or alternatively, a configuration data set may be stored in memory 105 that is internal to the host 104*a* (the configuration data set is not necessarily stored in a configuration file). Additionally or alternatively, a configuration data set may be entered as input parameters on service startup. The input parameters may be determined and specified by an invoker or initiator of the service.

In some cases, a system service 126*a* may utilize new information stored in a configuration file 124*a* and/or memory 105, only if the system service 126*a* is re-initialized. As an example, a configuration file corresponding to a system service may be modified. However, the system service does not adopt the modified configuration file until the system service is re-initialized. The system service may be re-initialized based on the modified configuration file.

In an embodiment, system services 126*a-b* have specific dependencies on each other, such that one particular system service must be initialized before another particular system service. As an example, a system service 126*a* may be dependent on a system service 126*b*. The system service 126*b* may be initialized. Then the system service 126*a* may be initialized. Then configuration data for the system service 126*b* may be modified. The system service 126*b* may be re-initialized based on modified configuration data. In this case, the system service 126*a* must be re-initialized as well, even though configuration data for the system service 126*a* has not been modified. The system service 126*a* needs to be re-initialized because (1) the system service 126*a* is dependent on the system service 126*b* and (2) the system service 126*b* was re-initialized after the last initialization of the system service 126*a*.

In one or more embodiments, a boot process puts a host 104*a* into an operational state and initializes an OS 120 of the host 104*a*. The specific operations or steps included in a particular boot process may be different depending on the host, and the hardware and/or software components thereof.

The following is an example of a boot process. Additional and/or alternative steps may be included in a boot process. First, there is the loading and execution of a BIOS (Basic Input/Output System). The host 104*a* loads the BIOS, or another non-volatile firmware that starts the boot process, into memory 105. The host 104*a* executes the BIOS. The BIOS identifies hardware components of the host 104*a* and checks the basic operability of the hardware components. The BIOS searches attached disks for a boot record. In some embodiments, an EFI (Extensible Firmware Interface) is used in lieu of or in addition to a BIOS.

Second, there is the loading and execution of the boot record. The host 104*a* loads the boot record into memory 105. The host 104*a* executes the boot record. The boot record locates the kernel.

Third, there is the loading and execution of the kernel. The host 104*a* loads the kernel into memory 105. The host 104*a* may load the kernel in one stage or in multiple stages. The kernel, if compressed, decompresses itself. The kernel sets up system functions such as essential hardware and memory paging. The kernel starts up a master system service. The master system service is configured to load other system services. In a Linux system, for example, the master system service may be referred to as systemd or init.

Fourth, there is the execution of the master system service. The host 104*a* loads and executes the master system service. The master system service determines which operating mode to apply to the host 104*a*, if any. Examples of operating modes include single-user mode, multi-user mode, command line only mode, and graphical user interface mode. Each operating mode is associated with one or more additional system services 126*a-b*.

Fifth, there is the initialization of the additional system services 126*a-b*. The master system service determines dependency relationships between the additional system services 126*a-b*. Additionally or alternatively, the master system service determines a sequence in which the additional system services 126*a-b* need to be initialized. The additional system services 126*a-b* may include one or more connection-oriented network communications services.

In one or more embodiments, a middleware program 128 operating on an OS 120 provides an execution environment for an application 130. A middleware program 128 provides an OS-independent abstraction layer between the OS and an application 130. A middleware program 128 provides a communications mechanism between one or more system services 126*a-b* and one or more applications 130.

In one or more embodiments, an application 130 is a self-contained computer program that performs specific useful tasks, other than system maintenance functions. As an example, an application may be configured to execute a user interface for interacting with a user. As another example, an application may be configured to execute a program interface for interfacing with another application. The application may receive input data from another application, and/or generate output data for another application. Examples of applications include a database application, a computer game, and an accounting application.

Applications 130 may be written to run on top of a particular OS 120, or may be written to interact with a middleware program 128. An application 130 may be executed on a host 104*a* only after the OS 120 has been initialized through a boot process.

The term "program" or "computer program," as used herein, refers to a collection of instructions that perform one or more tasks when executed by a computer. The term "program" or "computer program" may refer to an OS 120, a system service (such as any of system services 126*a-b*), a middleware program 128, and/or an application 130.

Some middleware programs 128 and/or applications 130 are initialized based on configuration data sets 124*c-d* corresponding to the middleware programs 128 and/or applications 130. As illustrated, for example, a middleware program 128 corresponds to a configuration data set 124*c*. An application 130 corresponds to a configuration data set 124*d*. A single configuration data set may correspond to a single middleware program or a single application. Additionally or alternatively, a single configuration data set may correspond to multiple middleware programs and/or applications.

As described above, a configuration data set (such as any of configuration data sets 124*a-d*) may be stored in one or more configuration files. Additionally or alternatively, a configuration data set may be stored in memory 105 that is internal to the host 104*a* (the configuration data set is not necessarily stored in a configuration file). Additionally or alternatively, a configuration data set may be entered as input parameters on service startup.

Referring back to FIG. 1A, in one or more embodiments, a hypervisor 106 is hardware and/or software configured to execute one or more virtual machines. A hypervisor 106 may execute on a physical machine or a virtual machine. A hypervisor 106 may store information that is accessible by one or more virtual machines 104a-b executing on the hypervisor 106. A hypervisor may be referred to as a "lower-level entity" that executes one or more virtual machines.

As described above, in order for a host 104a to communicate with facilities 103a-b available to a computing environment 102, the host 104a may need environment information. In an embodiment, a hypervisor 106 executing the host 104a is configured to obtain environment information from a registry manager 108. Any of hosts 104a-b executing on the hypervisor 106 may access the environment information obtained by the hypervisor 106. Examples of operations for obtaining environment information prior to completion of a boot process of the host 104a are described below with reference to FIG. 2.

In one or more embodiments, a host (such as any of hosts 104a-c) may include microcode, firmware, and/or other hardware or software components in addition to an OS 120. The OS 120 may execute on the other hardware or software components. The other hardware or software components may also be referred to as a "lower-level entity" that executes the OS 120. A lower-level entity may obtain environment information from a registry manager 108. The host 104a may access the environment information obtained by any lower-level entity.

In one or more embodiments, a registry manager 108 refers to hardware and/or software configured to maintain a registry 110 about facilities 103a-b available for use in a computing environment 102. A registry manager 108 may be implemented on a host inside or outside computing environment 102. A registry manager 108 may serve a single computing environment 102 or multiple computing environments. A registry manager 108 may receive a "read" request to read information stored in a registry 110. The registry manager 108 may retrieve the requested information from the registry 110. The registry manager 108 may transmit the requested information. Hence, a host 104a may obtain environment information from the registry manager 108.

In an embodiment, a registry manager 108 is configured to communicate over a network using a fixed address, such as a fixed IP address. Any host in the computing environment 102 may address a data packet to the fixed address in order to transmit the data packet to the registry manager 108.

In an embodiment, a registry manager 108 is configured to conduct a communication using only connectionless network communications protocols throughout a protocol stack. As an example, a registry manager may communicate using IP in the Internet layer, User Datagram Protocol (UDP) in the Transport layer, and Trivial File Transfer Protocol (TFTP) in the Application layer.

In one or more embodiments, a registry 110 includes values that are relevant to a program, executing on a particular host 104a, to interact with one or more facilities 103a-b available for use in the computing environment 102. Values relevant to a program, executing on a particular host 104a, to interact with facilities 103a-b available for use in the computing environment 102 may include (a) information about the facilities 103a-b themselves and/or (b) information that is not necessarily about any particular facility, as further described below. The program executing on the particular host 104a may be an OS 120, a system service 126a-b, a middleware program 128, and/or an application 130. The facilities 103a-b may be provided by a set of one or more hosts that is external to the particular host 104a requesting environment information. A registry 110 may include information about a single computing environment 102 or multiple computing environments.

The registry 110 includes information about facilities 103a-b that are available for use in a computing environment 102. As described above, such environment information may include, for example, identifier(s) of the facilities 103a-b, address(es) of the facilities 103a-b, port number(s) of the facilities 103a-b, communication protocol(s) used by the facilities 103a-b, and/or other attributes of the facilities 103a-b. Facilities 103a-b that are identified in the registry 110 may be referred to herein as "registered facilities." A host 104a may use information about the facilities 103a-b to interact with the facilities 103a-b. For example, a host may address a message to be transmitted to a particular facility based on an IP address and port number associated with the particular facility. Additionally or alternatively, a host 104a may use information about the facilities 103a-b to perform other functionality.

Additionally or alternatively, the registry 110 includes information that is not necessarily about any particular facility 103a-b. The registry 110 may include, for example, a character string identifying a particular computing environment in which a particular host is being started or initialized. The registry 110 may include, for example, a purpose of the computing environment (such as production, or testing). The registry 110 may include, for example, a locale of the computing environment. The registry 110 may include any other information that is associated with the computing environment 102. A host 104a may use information associated with the computing environment 102 to interact with the facilities 103a-b in a particular manner. For example, a host may communicate with a facility using different protocols and/or content, depending on whether the computing environment is in production mode or testing mode. Additionally or alternatively, a host 104a may use information associated with the computing environment 102 to perform other functionality. For example, a host may include an environment name in messages or log entries generated by the host. For example, a host may perform different operations, depending on whether the computing environment is in production mode or testing mode.

A registry 110 may maintain environment information as key-value pairs. For example, one entry may include a descriptor of a facility and attributes of the facility. A descriptor may be "LDAP." The attributes of "LDAP" may include the IP addresses corresponding to the LDAP service, the URIs corresponding to the LDAP service, and the port numbers corresponding to the LDAP service. There is an entry for each facility available for use in the computing environment. If there are more than one of a certain type of facility, there is an entry for each such facility. For example, if there are two LDAP services available to a computing environment, there may be two entries in the registry that have the key, "LDAP." The two "LDAP" entries may have different attributes, for example, different IP addresses, and different URIs. A registry may use other data structures, such as a hierarchical key-value structure (wherein a value of one key-value pair may be another key-value pair), a nested data structure, a data block with predefined fixed offsets, and/or any other data structure. For example, registry content may be represented as JavaScript Object Notation (JSON), Extensible Markup Language (XML), or YAML Ain't Markup Language (YAML).

In one or more embodiments, a validator 112 refers to hardware and/or software configured to perform operations described herein for validating whether a set of registered facilities, within a registry 110 of environment information, matches a set of expected facilities 114. Examples of operations for validating whether a set of registered facilities matches a set of expected facilities 114 are described below with reference to FIG. 3. A validator 112 may be implemented inside or outside computing environment 102.

In one or more embodiments, a set of expected facilities 114 for a computing environment 102 indicate the facilities that are expected to be available for use in the computing environment 102. As an example, a set of expected facilities 114 may include facilities that are functionally required by a computing environment 102 to provide a particular application. As another example, a set of expected facilities 114 may include facilities that are requested and/or purchased by a particular customer. As another example, a set of expected facilities 114 may include facilities that are required to provide a particular computing resource capacity.

In one or more embodiments, a registry manager 108 and/or a validator 112 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a hardware web server, a network policy server, a hardware proxy server, a generic machine, a function-specific hardware device, a storage device (e.g. a disk drive), a hardware router, a hardware switch, a hardware firewall, a hardware network address translator (NAT), a hardware load balancer, a mainframe, a monitor, a television, a content receiver, a set-top box, a printer, a mobile handset, a smartphone, a personal digital assistant (PDA), a wireless receiver and/or transmitter, a base station, a communication management device, a router, a switch, a controller, an access point, a client device, an Internet of Things (IoT) device (such as, a smart sensor, a smart switch, a smart refrigerator), a computerized prosthetic device, a robotic device, a computerized automotive device, and/or any specialized device including a processor.

In one or more embodiments, a data repository (not illustrated) is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as a registry manager 108 and/or a validator 112. Alternatively or additionally, a data repository may be implemented or executed on a computing system separate from registry manager 108 and/or a validator 112. A data repository may be communicatively coupled to registry manager 108 and/or a validator 112 via a direct connection or via a network. Information describing a registry 110 and expected facilities 114 may be implemented within one or more data repositories, and/or any components within the system 100.

3. Obtaining Environment Information Prior to Completion of a Boot Process

Figure 2:
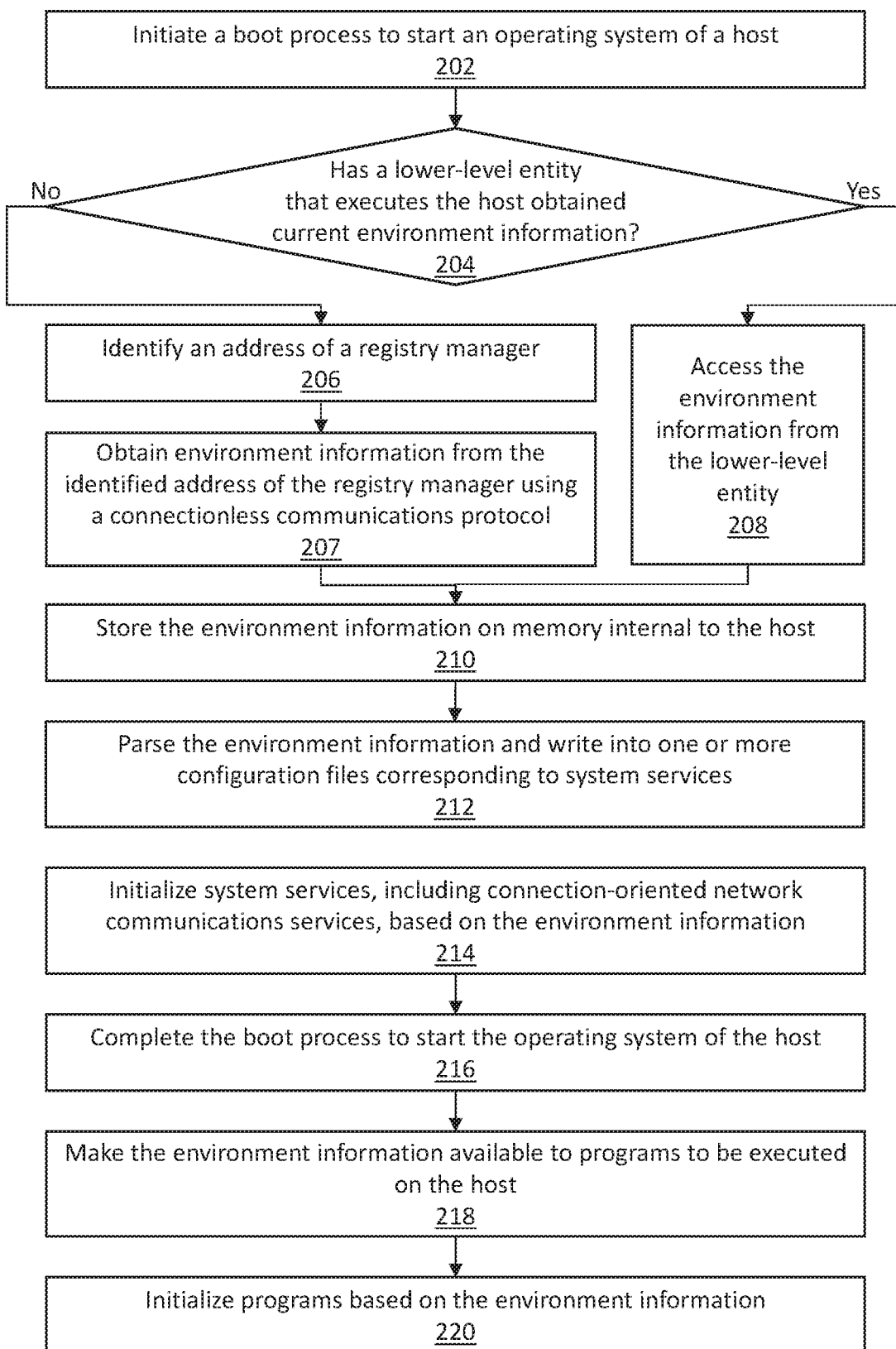
FIG. 2 illustrates an example set of operations for obtaining environment information prior to completion of a boot process, in accordance with one or more embodiments.

FIG. 2 illustrates an example set of operations for obtaining environment information prior to completion of a boot process, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments. Operations illustrated in FIG. 2 are described as being performed by a host 104a, however, the operations may be performed by any host 104a-d in a computing environment 102, and/or a hypervisor 106 executing a host 104a, and/or any lower level entity executing a host 104a (such as microcode). An operation performed by a host 104a may be performed by a physical machine and/or virtual machine, and/or any hardware or software executing thereon (such as an OS 120). A single entity may perform all operations and/or steps as described with reference to FIG. 2. Alternatively, different entities may perform different operations and/or steps as described with reference to FIG. 2.

One or more embodiments initiate a boot process to start an OS of a host (Operation 202). A host 104a initiates a boot process. Various different steps may be involved in the boot process, depending on the type of host 104a and/or OS 120 that is being started. The host 104a may, for example, execute a BIOS, load a kernel, and/or begin execution of a master system service. However, the host 104a has not yet performed any steps for initializing a connection-oriented network communications service. Further, the host 104a has not yet completed the boot process.

The host 104a may be a host that is newly added to a computing environment 102. Additionally or alternatively, the host 104a may be a host that is being restarted in a computing environment 102.

One or more embodiments determine whether a lower-level entity (such as a hypervisor) that executes the host has obtained current environment information (Operation 204). In an embodiment, the host 104a is a virtual machine executing on a hypervisor 106. The host 104a determines whether the hypervisor 106 previously obtained the environment information. The hypervisor 106 may have previously performed Operation 206-210 to obtain the environment information. The hypervisor 106 may have previously performed Operation 206-210 to obtain the environment information for another virtual machine executing on the hypervisor 106. The hypervisor 106 may have previously performed Operation 206-210 to obtain the environment information during a boot process for the other virtual machine.

The host 104a determines whether the previously-obtained environment information is still "current." Whether previously-obtained environment information is "current" may be based on whether a maximum time period has passed since the environment information was last obtained. The host 104a identifies the time stamp associated with the previously-obtained environment information. The host 104a determines whether the maximum time period has passed. If the maximum time period has not passed, then the environment information is current. If the maximum time period has passed, then the environment information is not current.

Additionally or alternatively, whether previously-obtained environment information is "current" may be based on whether a "significant event" has occurred since the environment information was last obtained. A user and/or application defines a list of significant events. Significant events may include, for example, an addition of a particular server to a computing environment, and a removal of a particular server to a computing environment. In an example, events such as the addition of an application on a machine, or a change in a configuration of a machine, might not classify as significant events. The host 104a compares the time stamp associated with the previously-obtained environment information and the time stamp associated with the last occurrence of a significant event. If there is no significant event occurring after the environment information was last obtained, then the environment information is current. If there is a significant event occurring after the environment information was last obtained, then the environment information is not current. Additional and/or alternative ways for determining whether environment information is current may be used.

In another embodiment, Operation 204 is not performed. Operations 206-210 are performed regardless of whether the hypervisor 106 has obtained current environment information. In another embodiment, Operation 204 is not applicable because the host 104a is not a virtual machine executing on a hypervisor 106, or there is no lower-level entity that is configured to obtain environment information. In another embodiment, a lower-level entity other than a hypervisor (such as microcode) may have previously obtained environment information. Whether the environment information obtained by that lower-level entity is current is determined.

If a lower-level entity has not obtained current environment information, then one or more embodiments identify an address of a registry manager (Operation 206). As described above, the registry manager 108 may be accessed using a fixed address, such as a fixed IP address.

During the boot process, the host 104a may load a BIOS, a boot record, a kernel, and/or other software components and files. The fixed address of the registry manager 108 is written into any of the BIOS, the boot record, the kernel, and/or other software components and files. The host 104a identifies the address of the registry manager 108 from the BIOS, the boot record, the kernel, and/or other software components and files.

Additionally or alternatively, a command to initiate the boot process for the host 104a may specify the fixed address of the registry manager 108. The host 104a identifies the address of the registry manager 108 from the command.

Additionally or alternatively, if a hypervisor 106 is used, the hypervisor 106 may be configured with the fixed address of the registry manager 108. As an example, the fixed address of the registry manager 108 may be specified in a command to start the hypervisor 106. As another example, the fixed address of the registry manager 108 may be specified in a settings file associated with the hypervisor 106. Hence, the host 104a identifies the address of the registry manager 108 based on the settings of the hypervisor 106.

Additionally or alternatively, the host 104a may obtain the fixed address of the registry manager 108 via a Dynamic Host Configuration Protocol (DHCP) broadcast, or a broadcast using another protocol.

One or more embodiments obtain environment information from the identified address of the registry manager using a connectionless communications protocol (Operation 207). The host 104a generates a message. The message includes a destination address and a message body. The destination address includes the address of the registry manager 108, identified at Operation 206. The message body includes a request for environment information. The message is transmitted over a network using a connectionless network communications protocol. In an embodiment, each communication layer involved in transmitting and/or receiving the message is associated with a connectionless network communications protocol. Hence, the entire protocol stack includes connectionless network communications protocols only. As an example, a host transmits a read request to a registry manager using the following communications protocols: IP in the Internet layer, UDP in the Transport layer, and TFTP in the Application layer.

The registry manager 108 receives the message including the request for environment information. The registry manager 108 responds by generating a message. The message includes at least a subset of the environment information maintained by the registry manager 108. The message may be included in one data packets. Alternatively, the message may be partitioned into multiple data packets. The registry manager 108 individually addressees each data packet to the host 104a. The registry manager 108 transmits each data packet over a network using a connectionless communications protocol. The host 104a receives the one or more data packets using a connectionless communications protocol. In an embodiment, each communication layer involved in transmitting and/or receiving the message is associated with a connectionless network communications protocol. Hence, the entire protocol stack includes connectionless network communications protocols only. As an example, a registry manager transmits data to a host using the following communications protocols: IP in the Internet layer, UDP in the Transport layer, and TFTP in the Application layer.

As described above, in a connectionless network communications protocol, no connections are maintained between successive transfers of data packets. There is no need to perform any handshakes for establishing a connection. There is no need to maintain any states associated with any connections. The host 104a does not need to execute any connection-oriented network communications services to transmit messages to, or receive messages from, the registry manager 108. In an embodiment, the host 104a has not yet performed any operations for initializing any connection-oriented network communications service when obtaining the environment information.

The environment information is obtained using a connectionless network communication protocol, rather than a connection-oriented network communications protocol. There is no need to initialize a connection-oriented network communications service generically, for the sake of obtaining environment information using connection-oriented network communications. Rather, the connection-oriented network communications service is initialized with the proper configurations for connecting to the facilities based on the already-obtained environment information.

As an example, TFTP may be used for transmitting the request for the environment information from the host 104a to the registry manager 108. TFTP may be used for transmitting the environment information from the registry manager 108 to the host 104a. Further details relating to using TFTP to obtain the environment information are described below with reference to FIGS. 4A-D.

If a lower-level entity has obtained current environment information, then one or more embodiments access the environment information from the lower-level entity (Operation 208). The host 104a accesses the environment information from the lower-level entity. Various ways of accessing the environment information from the lower-level entity may be used.

In an embodiment, the host 104a accesses the environment information from the lower-level entity via a shared memory. The shared memory is accessible by both the host 104a and the lower-level entity. The lower-level entity previously stored the environment information into the shared memory. The host 104a accesses the environment information from the shared memory.

In an embodiment, the host 104a accesses the environment information from the lower-level entity via a special instruction. The host 104a executes a special instruction (such as a service call) to return the environment information from the lower-level entity.

In an embodiment, the host 104a accesses the environment information from the lower-level entity via a network. The lower-level entity provides an application programming interface (API) through a network. The API may be, for example, a REST API. The host 104a makes a call to the API through the network.

Additional and/or alternative methods for accessing the environment information from the lower-level entity may be used.

One or more embodiments store the environment information on memory internal to the host (Operation 210). The host 104a stores at least a subset of the environment information, obtained from the registry manager 108, onto memory 105 internal to the host 104a. The environment information is stored as one or more configuration data sets on the memory 105. The environment information stored in the memory 105 is accessible by one or more system services, middleware programs, and/or applications.

One or more embodiments parse the environment information and write the environment information into one or more configuration files corresponding to one or more system services (Operation 212). Optionally, the host 104a parses the environment information obtained from the registry manager 108. The host 104a executes a particular program, such as a master system service. Based on the particular program, the host 104a identifies configuration files that need to be updated using the environment information. The host 104a determines whether all of the environment information, or a particular subset of the environment information, is relevant to each configuration file. The host 104a then stores the relevant portions of the environment information into each respective configuration file.

As an example, a host may determine that a first subset of the environment information is relevant to a first service. The host may determine that a second subset of the environment information is relevant to a second service. The host may determine that all of the environment information is relevant to a third service. Accordingly, the host may store the first subset of the environment information into a first configuration file corresponding to the first service. The host may store the second subset of the environment information into a second configuration file corresponding to the second service. The host may store all of the environment information into a third configuration file corresponding to the third service.

As an example, a computing environment may include an LDAP service and an NTP service. A host may be newly added to the computing environment. The host may need to execute a system service that interacts with the LDAP service, and another system service that interacts with the NTP service. The host may obtain environment information from a registry manager using a connectionless communications protocol. The environment information may include a URI of the LDAP service and a URI of the NTP service. The host may parse the environment information to identify the URI of the LDAP service. The host may store the URI of the LDAP service into a configuration file corresponding to the system service that interacts with the LDAP service. Additionally, the host may parse the environment information to identify the URI of the NTP service. The host may store the URI of the NTP service into a configuration file corresponding to the system service that interacts with the NTP service.

In an embodiment, the host 104a may perform a translation, conversion, and/or re-formatting of the environment information as part of the process of storing the environment information into a configuration file. The host 104a converts the environment information from one format into another format. As an example, the host 104a may obtain environment information that is stored as key-value pairs. The host 104a may convert the environment information into a JavaScript Object Notation (JSON) format. Additional and/or alternative formats may be used. (In some embodiments, the registry manager 108 may perform a translation, conversion, and/or re-formatting of the environment information stored in the registry prior to returning the environment information to the requesting host 104a.)

One or more embodiments initialize system services, including one or more connection-oriented network communications services, based on the environment information (Operation 214). The host 104a initializes a connection-oriented network communications service. The connection-oriented network communications service is initialized based on configuration data stored in memory 105 internal to the host 104a and/or a configuration file corresponding to the connection-oriented network communications service. The configuration data includes the environment information obtained at Operation 207.

In an embodiment, a connection-oriented network communications service is not able to communicate with facilities 103a-b without having the environment information associated with the facilities 103a-b. Moreover, the connection-oriented network communications service cannot utilize environment information stored in a configuration file (and/or memory 105 internal to host 104a) other than going through an initialization process.

However, based on the operations of FIG. 2 as described herein, at the time that the connection-oriented network communications service is initialized, the corresponding configuration file (and/or memory 105 internal to the host 104a) already includes the relevant information about the facilities 103a-b. Hence, the connection-oriented network communications service is configured to communicate with the facilities 103a-b as soon as the connection-oriented network communications service is initialized.

In an example, the host 104a executes a master system service. The master system service determines that the host 104a is to operate in a particular operating mode. The particular operating mode is associated with a configuration file. The particular operating mode is also associated with a connection-oriented network communications service. The host 104a obtains environment information from a registry manager 108. The host 104a stores the environment information into the configuration file associated with the particular operating mode. The host 104a initializes the connection-oriented network communications service based on the configuration file associated with the particular operating mode.

The following is an example illustrating an initialization of a system service based on environment information stored in a corresponding configuration file. As an example, a host may obtain the URI of an NTP service from a registry manager. The host may store the URI of the NTP service into a configuration file corresponding to a system service to be executed on the host. Thereafter, the host initializes the system service based on the configuration file. Based on the configuration file, the system service is configured to communicate with the URI of the NTP service as soon as the system service is initialized. The system service is ready to perform connection-oriented network communications with the NTP service as soon as the system service initialized.

One or more embodiments complete the boot process to start the OS of the host (Operation 216). As described above, the host 104a initializes one or more system services, including connection-oriented network communications services. When all system services are initialized, the boot process is complete. Since connection-oriented network communications services are initialized based on environment information that was already obtained, the connection-oriented network communications services are ready to use connection-oriented network communications protocols. Hence, the OS 120 of the host 104a is ready is communicate with the facilities 103a-b using connection-oriented network communications protocols as soon as the boot process is completed.

One or more embodiments make the environment information available to one or more programs to be executed on the host (Operation 218). Optionally, the host 104a may store the environment information in additional configuration files. The additional configuration files may correspond to middleware programs and/or applications. Examples relating to storing environment information in configuration files are described above with reference to Operation 212.

Middleware programs and/or applications to be executed on the host 104a may access the environment information from the memory 105 internal to the host 104a and/or the corresponding configuration files. Additionally or alternatively, middleware programs and/or applications to be executed on the host 104a may access the environment information via a system service. The system service may identify the environment information (or a relevant subset thereof) from the memory 105 and/or the corresponding configuration file, and return the environment information to the middleware programs and/or applications.

One or more embodiments initialize programs based on the environment information (Operation 220). After initialization of the OS 120 is completed, the host 104a initializes one or more middleware programs and/or applications. The middleware programs and/or applications are initialized based on the environment information. The environment information may be stored in configuration files and/or memory 105 internal to the host 104a.

In an embodiment, an application is not able to communicate with facilities 103a-b without having the environment information associated with the facilities 103a-b. Moreover, the application cannot utilize environment information stored in a configuration file (and/or memory 105 internal to the host 104a) other than going through an initialization process.

However, based on the operations of FIG. 2 as described herein, at the time that the application is initialized, the corresponding configuration file (and/or memory 105 internal to the host 104a) already includes the relevant information about the facilities 103a-b. Hence, the application is configured to communicate with the facilities 103a-b as soon as the application is initialized.

Figure 3:
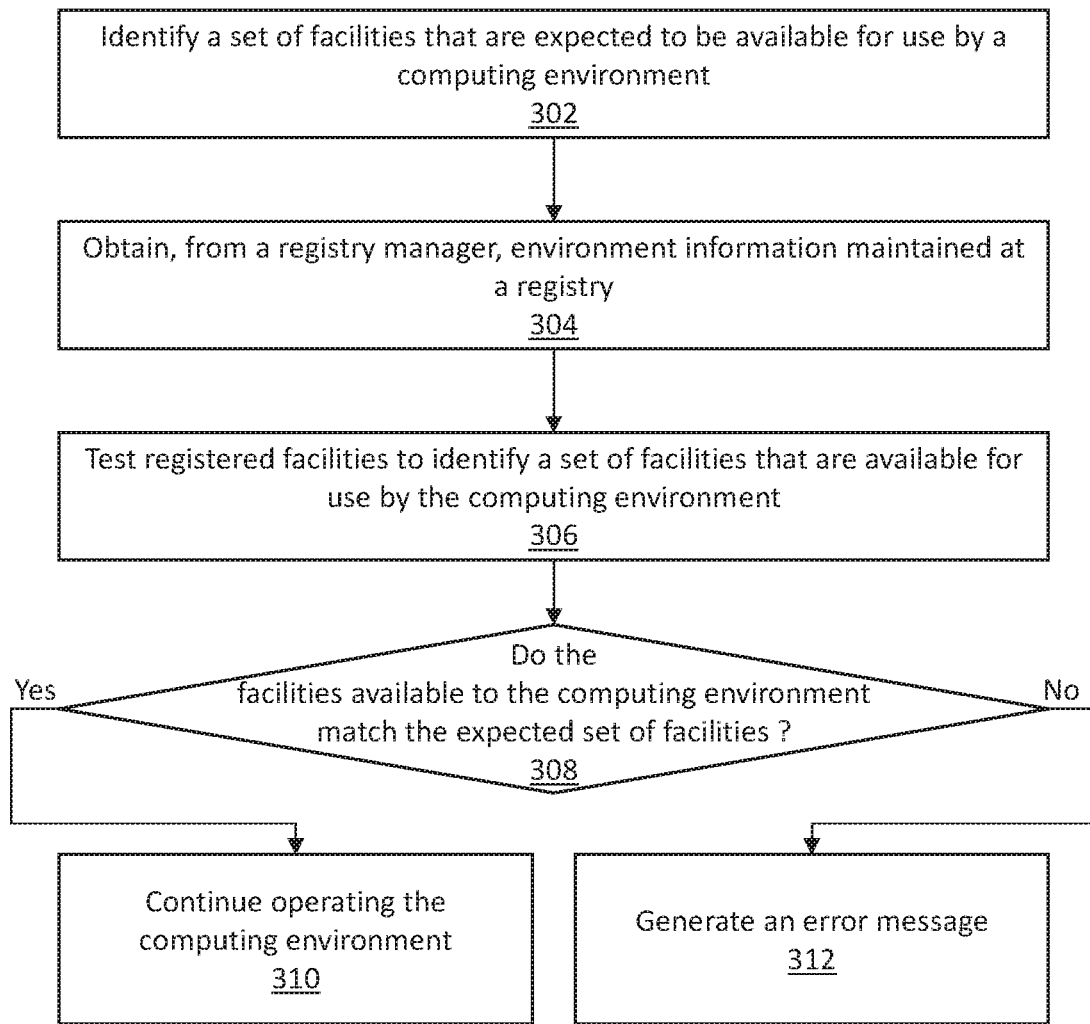
FIG. 3 illustrates an example set of operations for validating whether a set of registered facilities, within a registry of environment information, matches a set of expected facilities, in accordance with one or more embodiments.

4. Validating Whether a Set of Registered Facilities Matches a Set of Expected Facilities FIG. 3 illustrates an example set of operations for validating whether a set of registered facilities, within a registry of environment information, matches a set of expected facilities, in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments. Operations illustrated in FIG. 3 are described as being performed by a validator 112, however, the operations may be performed by any host 104a-d in a computing environment 102, and/or a hypervisor 106, and/or a registry manager 108. An operation performed by a host 104a may be performed by a physical machine and/or virtual machine, and/or any hardware or software executing thereon (such as an OS 120). A single entity may perform all operations and/or steps as described with reference to FIG. 3. Alternatively, different entities may perform different operations and/or steps as described with reference to FIG. 3.

One or more embodiments identify a set of facilities that are expected to be available for use in a computing environment (Operation 302). A validator 112 retrieves, from a data repository, a set of facilities that are expected to be available for use in a computing environment (also referred to herein as a "set of expected facilities"). The set of expected facilities may be specified by a user and/or an application. As an example, a set of expected facilities may indicate that a computing environment should have access to a certain number of LDAP servers, and a certain number of NTP servers.

One or more embodiments obtain, from a registry manager, environment information maintained at a registry (Operation 304). In an embodiment, the validator 112 obtains environment information from a registry manager 108 using a connectionless network communications protocol. Examples of operations for obtaining environment information from a registry manager 108 using a connectionless network communications protocol are described above with reference to Operation 207 of FIG. 2.

In another embodiment, the validator 112 obtains environment information from a registry manager 108 using a connection-oriented network communications protocol. The validator 112 may obtain environment information from the registry manager 108 using a mix of connection-oriented communications protocols and connectionless communications protocols.

The environment information identifies a set of registered facilities. Registered facilities are facilities that have been registered with the registry manager 108.

One or more embodiments test registered facilities (or a subset thereof) to identify a set of facilities that are available for use in the computing environment (Operation 306). Optionally, the validator 112 identifies a subset of the registered facilities that are testable from the environment information obtained from the registry manager 108. For example, a facility that requires access credentials cannot be fully tested if the validator 112 does not have the access credentials. A facility that is not intended for network communications (such as an environment name) is not testable. The validator 112 transmits a message to each registered facility that is testable. The validator 112 transmits the message to test whether the registered facility is still operating, functional, and/or available. The message includes a request for the registered facility to transmit a response, an acknowledgement, and/or information indicating a health or status of the registered facility. The validator 112 waits for a response from the registered facility. If there is no response at all, or the response indicates that the registered facility is not operating, then the validator 112 determines that the registered facility is not available for use in the computing environment. If there is a response indicating that the registered facility is operating, then the validator 112 determines that the facility is available for use in the computing environment. The validator 112 may iterate the testing process for each registered facility identified in the environment information. Hence, the validator 112 determines a set of facilities 103*a-b* that are available for use in the computing environment 102.

One or more embodiments determine whether the facilities available to the computing environment match the set of expected facilities (Operation 308). The validator 112 compares (a) the facilities 103*a-b* available to the computing environment 102, identified at Operation 306, and (b) the set of expected facilities, identified at Operation 302. (Alternatively, if Operation 306 is not performed, the validator 112 compares (a) the registered facilities included in the environment information, obtained at Operation 304, and (b) the set of expected facilities, identified at Operation 302.) The validator 112 determines whether the facilities 103*a-b* available to the computing environment 102 includes at least the set of expected facilities. If the facilities 103*a-b* available to the computing environment 102 includes at least the set of expected facilities, then the validator 112 determines that the facilities 103*a-b* available to the computing environment 102 match the set of expected facilities. If the facilities 103*a-b* available to the computing environment 102 does not include the set of expected facilities, then the validator 112 determines that the facilities 103*a-b* available to the computing environment 102 do not match the set of expected facilities.

As an example, a set of expected facilities may include: one LDAP service, and two NTP service. A validator may determine that facilities available to a computing environment include: one LDAP service, three NTP services, and two IDM services. The validator may determine that the facilities available to the computing environment include at least the set of expected facilities. Hence, the validator may determine that the facilities available to the computing environment match the set of expected facilities.

If the facilities available to the computing environment match the set of expected facilities, then one or more embodiments continue operating the computing environment (Operation 310). The validator 112 allows the computing environment to continue operating without interruption. The set of hosts 104*a-c* in the computing environment continue to execute to provide one or more applications.

If the facilities available to the computing environment do not match the set of expected facilities, then one or more embodiments generate an error message (Operation 312). The validator 112 generates an error message. The error message may be presented at a user interface. Optionally, the validator 112 interrupts the operation of the computing environment.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 4A-D illustrate an example for obtaining environment information prior to completion of a boot process, in accordance with one or more embodiments.

Figure 4A:
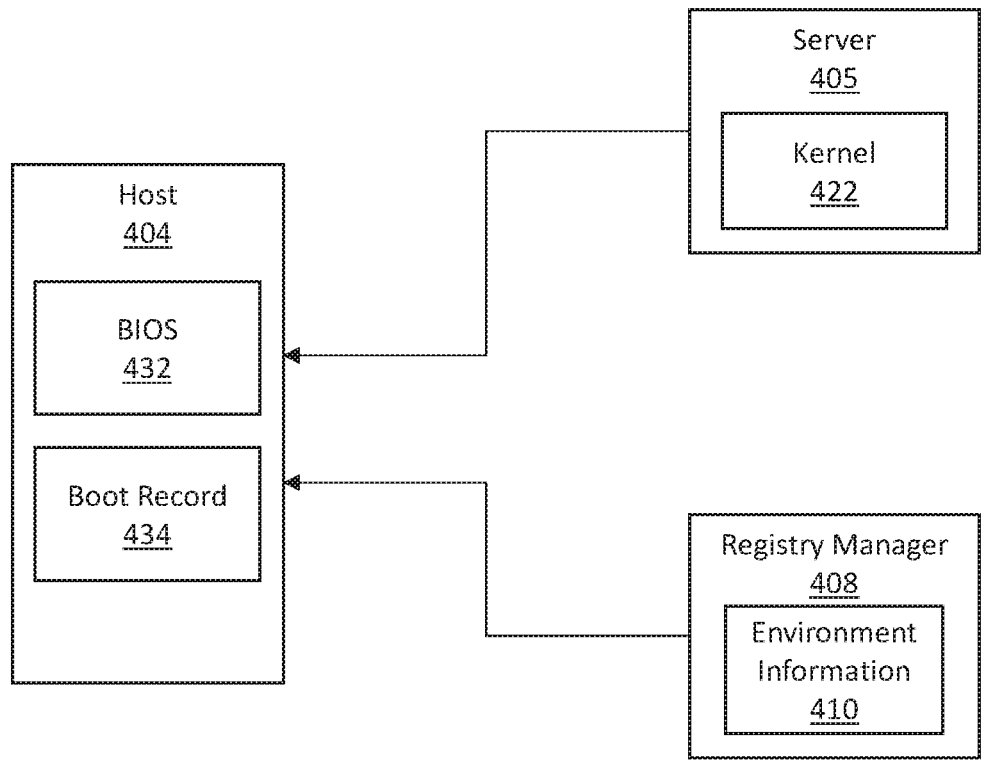
FIGS. 4A-D illustrate an example for obtaining environment information prior to completion of a boot process, in accordance with one or more embodiments.

As illustrated in FIG. 4A, a host 404 is turned on, which triggers an initialization of an OS for the host 404.

The host 404 initially loads and executes a BIOS 432. As part of execution of the BIOS 432, the host 404 loads a boot record 434. The host 404 executes the boot record 434 to locate the kernel 422. The kernel is stored at a server 405. The host 404 retrieves the kernel 422 from the server 405. The host 404 additionally obtains environment information 410 from a registry manager 408. The server 405 and the registry manager 408 may be implemented on a same machine or different machines. At the time the host 404 obtains the environment information 410 from the registry manager 408, there are no connection-oriented network communications services being executed or initialized on the host 404.

The host 404 obtains the environment information 410 from the registry manager 108 using TFTP. TFTP is a lockstep communications protocol. First, the host 404 generates a request to read the environment information. The host 404 addresses the request to the address of the registry manager 408, which is obtained via DHCP broadcast. The host 404 transmits the request over a network to the registry manager 408.

The registry manager 408 partitions the environment information into multiple blocks of data. Each block of data may be, for example, 512 bytes. Each block of data is to be transmitted in a single data packet. The registry manager 408 transmits the first data packet.

The host 404 receives the first data packet. The host 404 transmits an acknowledgement back to the registry manager 408.

In response to receiving the acknowledgment, the registry manager 408 transmits the next data packet. The registry manager 408 and the host 404 iterate the process in order to communicate each block of data from the registry manager 408 to the host 404.

If the registry manager 408 does not receive an acknowledgement for a particular data packet within a threshold time period, then the registry manager 408 re-transmits the particular data packet. The lockstep acknowledgment aims to ensure that all data packets are actually received.

Finally, the registry manager 408 transmits the last data packet. The registry manager 408 receives an acknowledgement for the last data packet. The registry manager 408 transmits a message indicating that the last data packet has been transmitted. The transmission of the environment information ends.

Figure 4B:
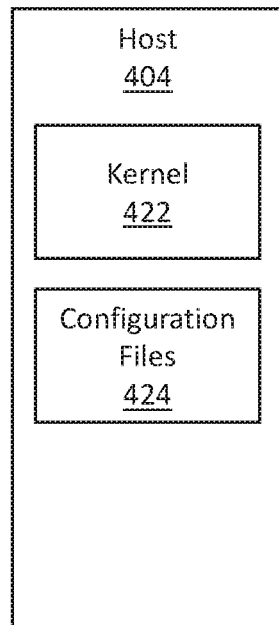

As illustrated at FIG. 4B, the host 404 loads the kernel 422 into memory. The host 404 also stores the environment information 410 into one or more configuration files 424.

As an example, the host 404 parses the environment information 410 to extract the information relevant to a particular connectionless network communications service. The host 404 converts the environment information into a data format used by a configuration file 424 corresponding to the particular connectionless network communications service. The host 404 stores the converted environment information into the configuration file 424.

Figure 4C:
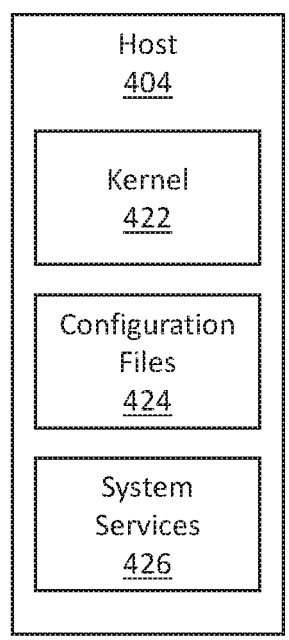

As illustrated at FIG. 4C, the host 404 then initializes system services 426, including a connection-oriented network communications service. At the time the connection-oriented network communications service is initialized, the corresponding configuration file 424 is already in place. The configuration file 424 already includes the environment information that is needed by the connection-oriented network communications service for interacting with the facilities available to the computing environment.

The host 404 initializes the connection-oriented network communications service based on the environment information in the corresponding configuration file 424. The connection-oriented network communications service may be configured with, for example, identifiers of the facilities, addresses of the facilities, port numbers used for communicating with the facilities, communications protocols used by the facilities, and/or other information associated with the facilities. Hence, the connection-oriented network communications service is ready to perform connection-oriented network communications with the facilities upon being initialized.

Figure 4D:
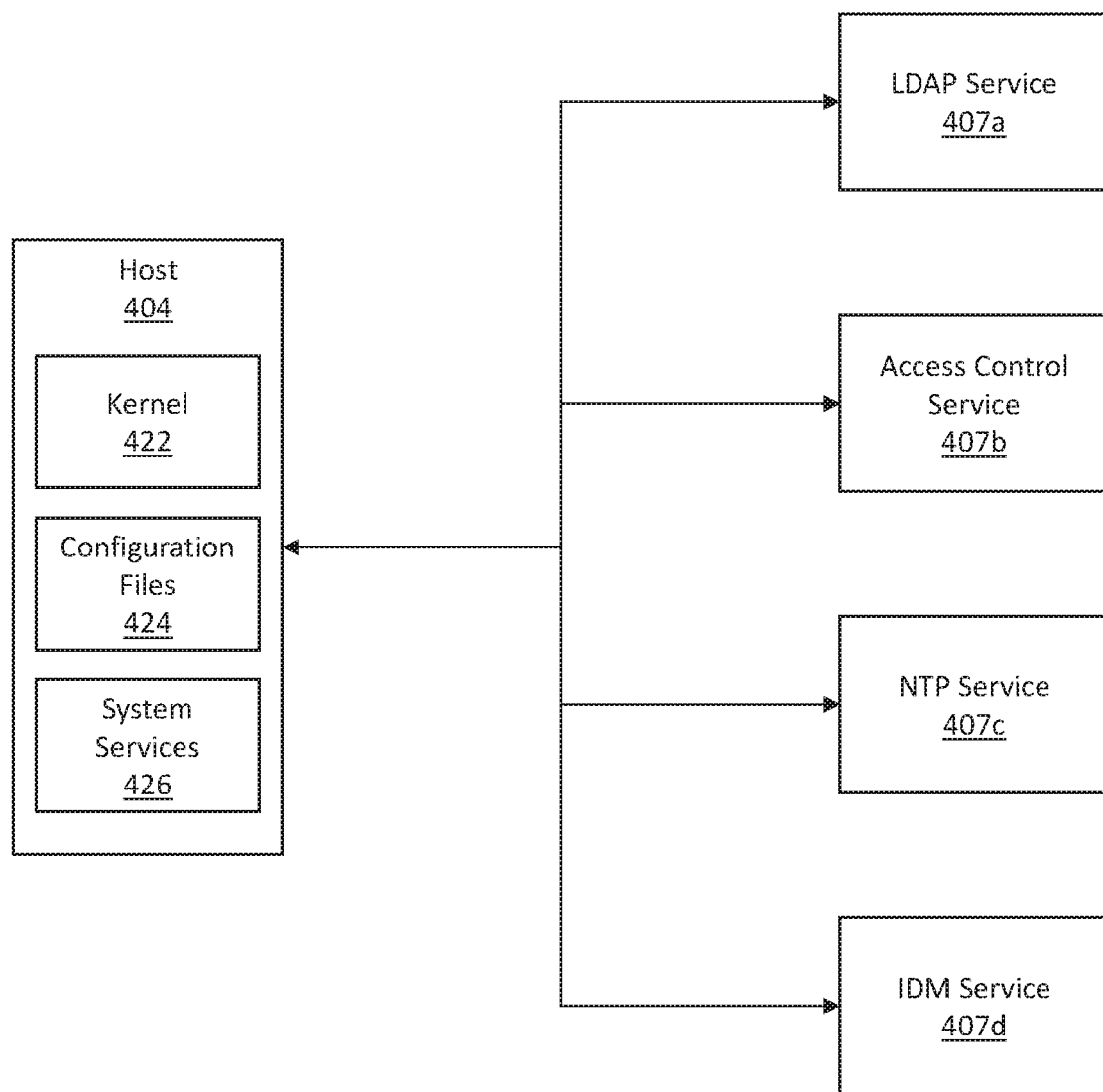

As illustrated at FIG. 4D, after the system services 426 are initialized, the host 404 is able to communicate with facilities available to the computing environment, such as an LDAP service 407*a*, an access control service 407*b*, an NTP service 407*c*, and an IDM service 407*d*. The host 404 communicates with the facilities 407*a-d* using one or more connection-oriented network communication protocols. The host 404 communicates with the facilities 407*a-d* using a connection-oriented network communications protocol based on the environment information stored in the configuration files 424.

As an example, a configuration file 424 corresponding to a connection-oriented network communications service indicates a URI of an IDM service 407*d*. The host 404 uses the URI of the IDM service 407*d* to communicate with the IDM service 407*d* using a connection-oriented network communications protocol.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an OS, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

7. Communications Protocols

A communications protocol is a system of rules that allow two or more hosts to communicate with each other. The communications protocol defines the rules, syntax, semantics, and/or formats associated with communication between two or more hosts. A single communication may involve multiple communication layers, which may align to the Open Systems Interconnection (OSI) network model or the Transmission Control Protocol (TCP)/Internet Protocol (IP) network model. Each communication layer may be associated with a different protocol. The set of protocols used throughout the different communication layers of a single communication may be referred to as a "protocol suite" or "protocol stack." As an example, a communication over the Internet uses the TCP/IP layers. The communication is associated with an Internet protocol suite. The TCP/IP layers include: Link layer; Internet layer; Transport layer; and Application layer. An Internet protocol suite includes a different protocol for each layer. The Link layer may use, for example, the Medium Access Control (MAC) protocol. The Internet layer may use the Internet Protocol (IP). The Transport layer may use the Transmission Control Protocol (TCP), or the User Datagram Protocol (UDP). The Application Layer may use the File Transfer Protocol (FTP), the Trivial File Transfer Protocol (TFTP), or the Hypertext Transfer Protocol (HTTP).

A communications protocol may be connection-oriented or connectionless. A protocol stack for a single communication may include all connection-oriented communications protocols, or all connectionless communications protocols, or a mix of connection-oriented communications protocols and connectionless communications protocols.

In a connection-oriented network communications protocol, data transfer occurs only while a connection is established. A connection is established by performing a handshake. A connection is terminated by performing another handshake. Each host maintains a state associated with a connection. The state indicates which step, within a handshaking process, has been performed. TCP is an example of a connection-oriented communications protocol. In TCP, a three-way handshake is performed. Initially, a client and a server are each in a CLOSED state. The client sends a command to establish a connection. The command to establish the connection includes a random value (A). The client reaches a SYN state. The server replies with an acknowledgment. The acknowledgment includes: (a) the received random number plus one (A+1); and another random number (B). The server reaches a SYN RECEIVED state. The client transmits another acknowledgment. The acknowledgment includes the received random number plus one (B+1). The client reaches an ESTABLISHED state. The server receives the acknowledgement. The server also reaches an ESTABLISHED state. Thereafter, a connection is established between the client and the server. One or more data packets may be transferred over the same connection. Within the same connection, a transmitting host sequentially numbers each data packet that is transmitted. A receiving host rearranges the received data packets according to the numbering. The receiving host may notify the transmitting host if any of the data packets are missing. The transmitting host may re-transmit any missing data packets.

In a connectionless network communications protocol, no connections are maintained between successive transfers of data packets. Hosts do not maintain any states associated with any connections. Each data packet is individually addressed to a recipient. Each data packet is routed based on information carried in the data packet itself. There is no inherent ordering in data packets transmitted over a connectionless communications protocol. TFTP, UDP, and IP are examples of connectionless communications protocols.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or a Liquid-crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
    initiating a boot process to start an operating system for a first host;
    during the boot process and prior to initializing any connection-oriented network communications service:
    obtaining environment information from a second host using a connectionless network communications protocol, the connectionless network communications protocol being performed without establishing a connection via a handshake, wherein:
        the second host is external to the first host; and
        the environment information comprises one or more values relevant to a program, which executes on the first host, to interact with a facility provided by a set of one or more hosts that is external to the first host;
    storing at least a first subset of the environment information on a memory associated with the first host;
    initializing a first system service, a first middleware program, or a first application on the first host based on the first subset of the environment information that is (a) obtained using the connectionless network communications protocol and (b) stored on the memory internal to the first host; and
    initializing a second system service, a second middleware program, or a second application on the first host, based on a second subset of the environment information that is obtained using the connectionless network communications protocol.

2. The one or more media of claim 1, wherein at least one of the first host and the second host is executed on a first lower-level entity and a second-lower level entity, respectively.

3. The one or more media of claim 2, wherein at least one of the first lower-level entity and the second-lower level entity comprise a virtual machine executing on a hypervisor.

4. The one or more media of claim 1, wherein:
    at least one of the first system service or the second system service are initialized using a first configuration data set and a second configuration data set that include the first subset of the environment information and the second subset of the environment information, respectively; and
    one or more of the first configuration data set and the second configuration data set include one or more of a domain name of the facility or a port of the facility.

5. The one or more media of claim 1, the operations further comprising:
    determining whether the obtained environment information is current; and
    responsive to determining that the environment information is not current, re-obtaining the environment information from the second host.

6. The one or more media of claim 1, wherein the first subset of the environment information is different than the second subset of the environment information.

7. The one or more media of claim 1, wherein the first subset of the environment information is the same as the second subset of the environment information.

8. A method comprising:
    initiating a boot process to start an operating system for a first host;
    during the boot process and prior to initializing any connection-oriented network communications service:
    obtaining environment information from a second host using a connectionless network communications protocol, the connectionless network communications protocol being performed without establishing a connection via a handshake, wherein:
        the second host is external to the first host; and
        the environment information comprises one or more values relevant to a program, which executes on the first host, to interact with a facility provided by a set of one or more hosts that is external to the first host;
    storing at least a first subset of the environment information on a memory associated with the first host;
    initializing a first system service, a first middleware program, or a first application on the first host based on the first subset of the environment information that is (a) obtained using the connectionless network communications protocol and (b) stored on the memory internal to the first host; and
    initializing a second system service, a second middleware program, or a second application on the first host, based on a second subset of the environment information that is obtained using the connectionless network communications protocol.

9. The method of claim 8, wherein at least one of the first host and the second host is executed on a first lower-level entity and a second-lower level entity, respectively.

10. The method of claim 9, wherein at least one of the first lower-level entity and the second-lower level entity comprise a virtual machine executing on a hypervisor.

11. The method of claim 8, wherein:
    at least one of the first system service or the second system service are initialized using a first configuration data set and a second configuration data set that include the first subset of the environment information and the second subset of the environment information, respectively; and
    one or more of the first configuration data set and the second configuration data set include one or more of a domain name of the facility or a port of the facility.

12. The method of claim 8, further comprising:
    determining whether the obtained environment information is current; and
    responsive to determining that the environment information is not current, re-obtaining the environment information from the second host.

13. The method of claim 8, wherein the first subset of the environment information is different than the second subset of the environment information.

14. The method of claim 8, wherein the first subset of the environment information is the same as the second subset of the environment information.

15. A system comprising:
    a first host including a first hardware processor;

a second host including a second hardware processor, the second host external to the first host;

the system configured to perform operations comprising:

initiating a boot process to start an operating system for the first host;

during the boot process and prior to initializing any connection-oriented network communications service:

obtaining environment information from the second host using a connectionless network communications protocol, the connectionless network communications protocol being performed without establishing a connection via a handshake, wherein:

the environment information comprises one or more values relevant to a program, which executes on the first host, to interact with a facility provided by a set of one or more hosts that is external to the first host;

storing at least a first subset of the environment information on a memory associated with the first host;

initializing a first system service, a first middleware program, or a first application on the first host based on the first subset of the environment information that is (a) obtained using the connectionless network communications protocol and (b) stored on the memory internal to the first host; and initializing a second system service, a second middleware program, or a second application on the first host, based on a second subset of the environment information that is obtained using the connectionless network communications protocol.

16. The system of claim 15, wherein at least one of the first host and the second host is executed on a first lower-level entity and a second-lower level entity, respectively.

17. The system of claim 16, wherein at least one of the first lower-level entity and the second-lower level entity comprise a virtual machine executing on a hypervisor.

18. The system of claim 15, wherein:

at least one of the first system service or the second system service are initialized using a first configuration data set and a second configuration data set that include the first subset of the environment information and the second subset of the environment information, respectively; and one or more of the first configuration data set and the second configuration data set include one or more of a domain name of the facility or a port of the facility.

19. The system of claim 15, wherein the first subset of the environment information is different than the second subset of the environment information.

20. The system of claim 15, wherein the first subset of the environment information is the same as the second subset of the environment information.

* * * * *